United States Patent [19]
Chow et al.

[11] Patent Number: 6,021,449
[45] Date of Patent: Feb. 1, 2000

[54] VIDEO FIFO OVERFLOW CONTROL METHOD THAT BLOCKS VIDEO ENCODER DATA WHEN OVERFLOW IS IMMINENT AND RESUMES FLOW WHEN FRAMES SIZES HAVE RETURNED TO NOMINAL SIZE

[75] Inventors: Robert Chow, Burnaby; Hamish D. Dobson, Coquitlam, both of Canada

[73] Assignee: International Business Machines Corporation, Armonk, N.Y.

[21] Appl. No.: 08/904,773

[22] Filed: Aug. 1, 1997

[51] Int. Cl.[7] .................................................. G06F 13/14
[52] U.S. Cl. ............................ 710/57; 348/419; 370/517
[58] Field of Search .......................... 710/1, 57; 348/390, 348/419; 711/154; 370/517; 358/133

[56] References Cited

U.S. PATENT DOCUMENTS

| | | | |
|---|---|---|---|
| 4,907,188 | 3/1990 | Racey | 364/900 |
| 5,159,447 | 10/1992 | Haskell et al. | 358/133 |
| 5,530,477 | 6/1996 | Coelho | 348/390 |
| 5,751,356 | 5/1998 | Suzuki | 348/390 |
| 5,835,498 | 11/1998 | Kim et al. | 370/537 |
| 5,838,678 | 11/1998 | Davis et al. | 370/389 |
| 5,859,660 | 1/1999 | Perkins et al. | 348/9 |
| 5,875,007 | 2/1999 | Zhung et al. | 348/845.2 |

*Primary Examiner*—Thomas C. Lee
*Assistant Examiner*—Albert Wang
*Attorney, Agent, or Firm*—Kenneth A. Seaman

[57] ABSTRACT

A multimedia terminal having a host processor, an audio and video encoder and a system time clock. The encoders are input as digital video elementary frames into a multiplexer. The multiplexer includes a mux processor, a video FIFO and a video mux logic circuit coupled to both the mux processor and the video FIFO. Mux logic is operative to monitor video FIFO fullness and to signal the mux processor when there is sufficient video data in the FIFO to form the payload of a transport packet.

11 Claims, 4 Drawing Sheets

VIDEO FIFO OVERFLOW CONTROL METHOD THAT BLOCKS VIDEO ENCODER DATA WHEN OVERFLOW IS IMMINENT AND RESUMES FLOW WHEN FRAMES SIZES HAVE RETURNED TO NOMINAL SIZE

RELATED APPLICATIONS

The following patent applications are related to the application and are incorporated herein by reference:

| Title | Ser. No. | Filing Date |
|---|---|---|
| Multiplexer for Multiple Media Streams | 08/904,813 | 8/1/97 |
| Frame Buffer for Multimedia Terminal | 08/904,819 | 8/1/97 U.S. Pat. No. 5,949,441 |
| Isolation of Multimedia Signals for Transmission and Processing Within a Multimedia Terminal | 08/904,778 | 8/1/97 |
| Internet Application Access Server Apparatus and Method | 08/905,797 | 8/1/97 |
| Network Communication Services Method and Apparatus | 08/904,939 | 8/1/97 |
| Method and Apparatus for Maintaining Directory Services for a Video Transmmission Network | 08/904,774 | 8/1/97 |
| Method and Apparatus for Controlling Access in a Video Distribution Network | 08/904,776 | 8/1/97 U.S. Pat. No. 5,953,051 |
| Method and Apparatus for Controlling Network Switches | 08/904,775 | 8/1/97 |
| Method and Apparatus for Controlling a Mixed Network of Analog and Digital Switches | 08/904,812 | 8/1/97 |

FIELD

The present invention relates to a method and apparatus for implementing and multiplexing multiple media streams in accordance with IOC/AEC 13818-1 MPEG-2 systems standard.

BACKGROUND

A multimedia system provides end-to-end service delivery by bundling high speed multimedia streams for transmission over ATM or other networks, unbundling them and using or storing them. Such streams may correspond to video, audio, signals used to control robotic applications, force-feedback applications, agile manufacturing and the like. A typical application may correspond to transmitting video and audio signals over an ATM network to a desired endpoint. The video signals may emanate as a digitized file from a file server or be an external analog video signal as from a camera, laser disc or VCR which must be digitized, compressed and then sent to a network interface (NIC) card for transmission into digital network for eventual reception by another multimedia terminal that would perform the inverse operation of demultiplexing, decoding and sending the decoded video signal to an analog television monitor.

Multimedia signals are typically high-bandwidth and time-sensitive in nature. A suitable compression scheme is, therefore, required such as MPEG-2 (Motion Picture Experts Group) and involves bit-rates in excess of 4 Megabits per second up to as high as 20 Megabits per second. One of the problems when faced with such high bandwidth signals is how to build an inexpensive high-bandwidth multiplexer to packetize and synchronize multiple media streams into one multiplex stream.

Another problem involves multimedia signals that transfer video data. The compressed video frame sizes vary significantly and the instantaneous bit-rate can be quite bursty especially during scene-changes in the source resulting in the overflow of the FIFO.

Accordingly, it is an object of the present invention to provide a multiplexer which utilizes an improved circuit to control overflow of data into the FIFO.

SUMMARY OF THE INVENTION

According to the invention there is provided a multimedia terminal having a host processor, a video encoder and a system time clock. The encoders are input as digital video elementary frames into a multiplexer. The multiplexer includes a mux processor, a video FIFO and a video mux logic circuit coupled to both the mux processor and the video FIFO's. Mux logic is operative to monitor video FIFO fullness and to signal the mux processor when there is sufficient video data in the FIFO to form the payload of a transport packet in accordance with an encoder/decoder protocol.

Preferably the encoder/decoder protocol is the MPEG-2 protocol.

The video mux logic circuit signals the mux processor when the video elementary stream has a high rate of data and rate control is required. The video mux logic circuit further signals the mux processor to drop a video frame when the channel bandwidth is too high and the data into the video FIFO is backed up.

The video mux logic circuit signals the mux processor when a video start code is present in the transport packet payload that it is about to read. The video mux logic circuit further tracks the video start codes through the video FIFO with a video state machine.

The multiplexer includes a FIFO write logic that controls the writing of compressed data to the FIFO. The multiplexer can determine whether a new frame begins in the next packet of elementary video stream data.

In another aspect of the invention, there is provided a method of controlling video FIFO overflows caused by a high rate of compressed digital video signals being sent by a video encoder. The method includes detecting imminent video FIFO overflows, blocking all subsequent compressed data from entering the video FIFO, monitoring frame sizes out of the video encoder and allowing data to begin entering the video FIFO when frame-sizes from the encoder have returned to a nominal size.

The detecting step comprises detecting start codes at an input to the FIFO so that frame sizes may be monitored even when data is not being allowed into said FIFO.

The method. may include informing the mux processor of elementary video stream frame drop events so that it may insert corresponding error codes into the elementary stream.

BRIEF DESCRIPTION OF THE DRAWINGS

Further features and advantages will be apparent from the following detailed description, given by way of example, of a preferred embodiment taken in conjunction with the accompanying drawings, wherein.

DETAILED DESCRIPTION WITH REFERENCE TO THE DRAWINGS

Figure 1:
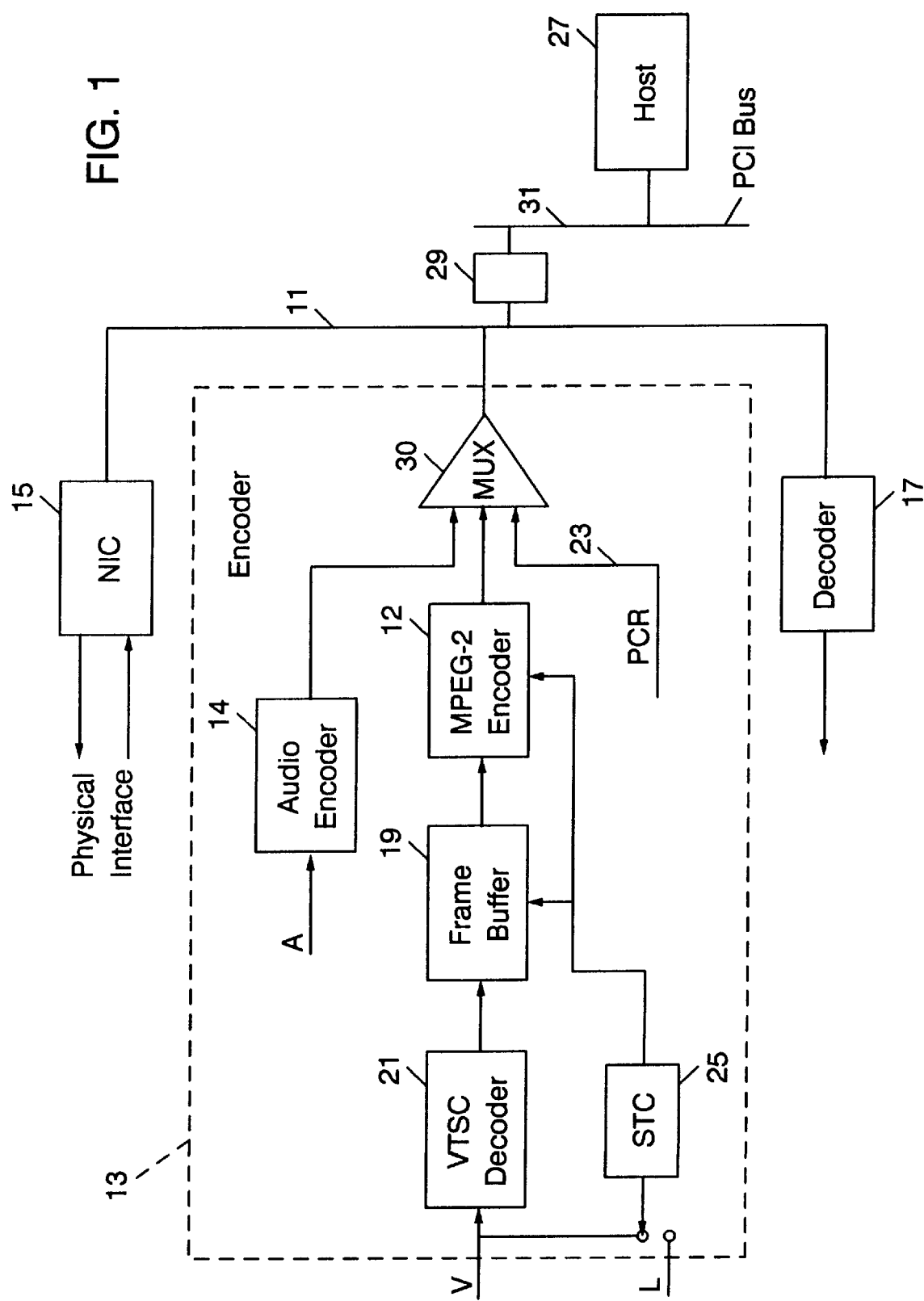
FIG. 1 is a schematic diagram of a multimedia network coupled to a PCI bus.

Multimedia terminals, such as multimedia desktop computers, consist of a variety of hardware and software modules. The hardware modules consist of physical devices such as plug-in cards that perform specific data and signal processing tasks, whereas the software modules comprise microprocessor software code that executes either on microprocessors located on the hardware modules, or on a host microprocessor. In the present case a set of such hardware is shown in FIG. 1 in which multimedia signals are transmitted between and encoder 13, a decoder 17 and a network interface device (NIC) 15 via a PCI bus 11. A host computer 27 may be coupled to the PCI bus 11 directly or through a bridge 29 from another PCI bus 31. For example, analog video signals are received by an NTSC decoder 21 which digitizes the analog input to provide a digital stream for the frame buffer 19 The frame buffer 19 synchronizes digital video data to the system time clock (STC) 25 and provides the synchronized signals to a MPEG-2 encoder 12. An audio encoder 14 provides audio data to the MUX 30. The Program Clock Reference (PCR) 23 is a MPEG-2 preformatted packet obtained from a PCR register to which the STC 25 is latched once the mux 30 has read from this register. It is a time stamp that synchronizes the sending and receiving terminals and is generated at intervals specified by the host software just prior to being read by the NIC 15. It is multiplexed together with audio and video data and sent to the NIC 15 in packets in priority ahead of the audio and video data. At the receiving terminal (not shown) the transport stream is demultiplexed so that separate audio, video and PCR streams are reproduced.

Figure 2:
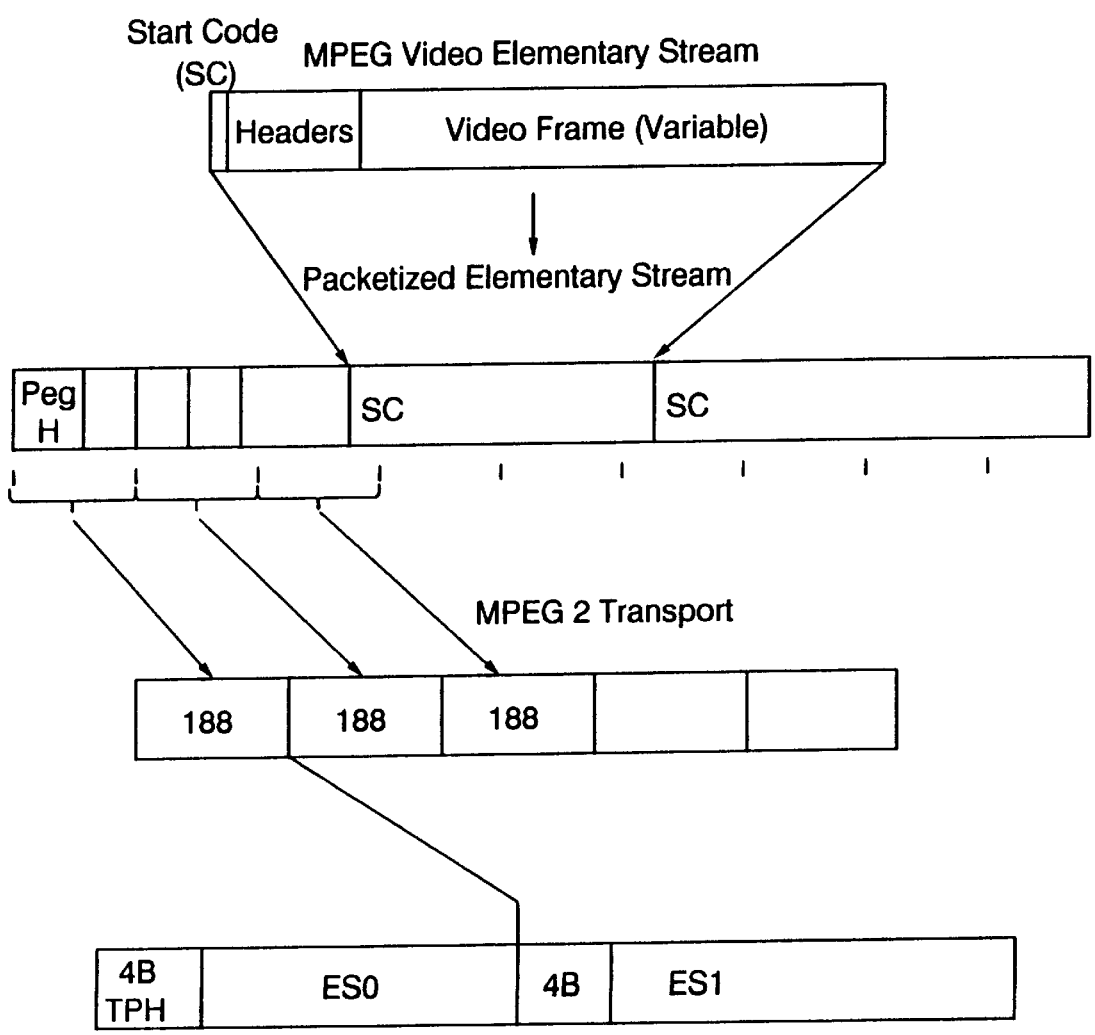
FIG. 2 is a schematic diagram of the packetizing of a MPEG-2 video elementary stream.

Referring to FIG. 2 each video frame has a start code (SC) at the beginning of the frame followed by other header information. The MPEG video elementary stream is formed into a packetized elementary stream which includes a Packetized Elementary Stream header (PES header) containing Presentation Time Stamp (PTS) information. The PES header is inserted every n access units where an access unit is a frame of compressed video or audio data. The PTS contains the time at which the audio or video frame is encoded. In addition, each video or audio frame including its start code is concatenated after the PES header. From the packetized elementary stream an MPEG-2 transport stream is formed by breaking up separate PES streams into transport packet payloads. Transport packet header information is generated (4 bytes) appended to 184 bytes of payload data packets containing either audio or video data are built depending upon which data is ready for insertion first. This process is continued until a start code for either audio or video frames is encountered at which point a new PES packet is started.

Figure 3:
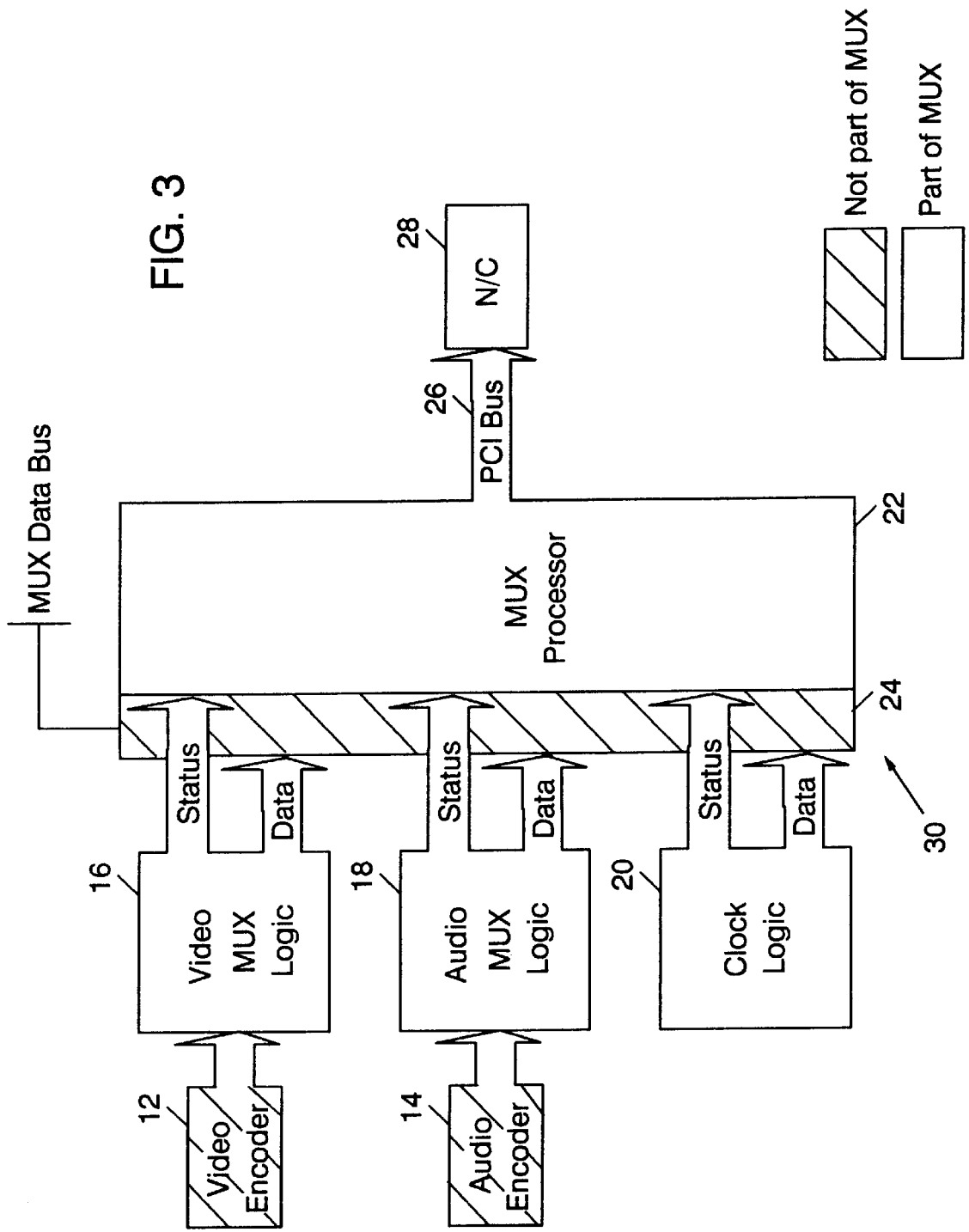
FIG. 3 is a block diagram showing the multiplexer.

Referring to FIG. 3, the MPEG-2 encoder 12 delivers an MPEG-2 video elementary stream to the video mux logic 16 and the audio encoder 14 generates an elementary stream which it sends to the audio mux logic circuit 18 coupled to the MUX data bus. The mux logic circuits 16 and 18 contain FIFO's 32 (see FIG. 4) which buffer the video and audio elementary stream data and, when there is sufficient video data in the FIFO 32 (see FIG. 4) to form the payload of an MPEG-2 transport packet, signals a mux microprocessor 22 coupled to NIC 28 by PCI bus 26. A video FIFO fullness counter 40 (see FIG. 4) then keeps track of the number of bytes of video data in the FIFO 32 at any time. An interrupt generator 42 interrupts the mux 30 whenever the number of bytes in the video FIFO 32 exceeds 184.

Figure 4:
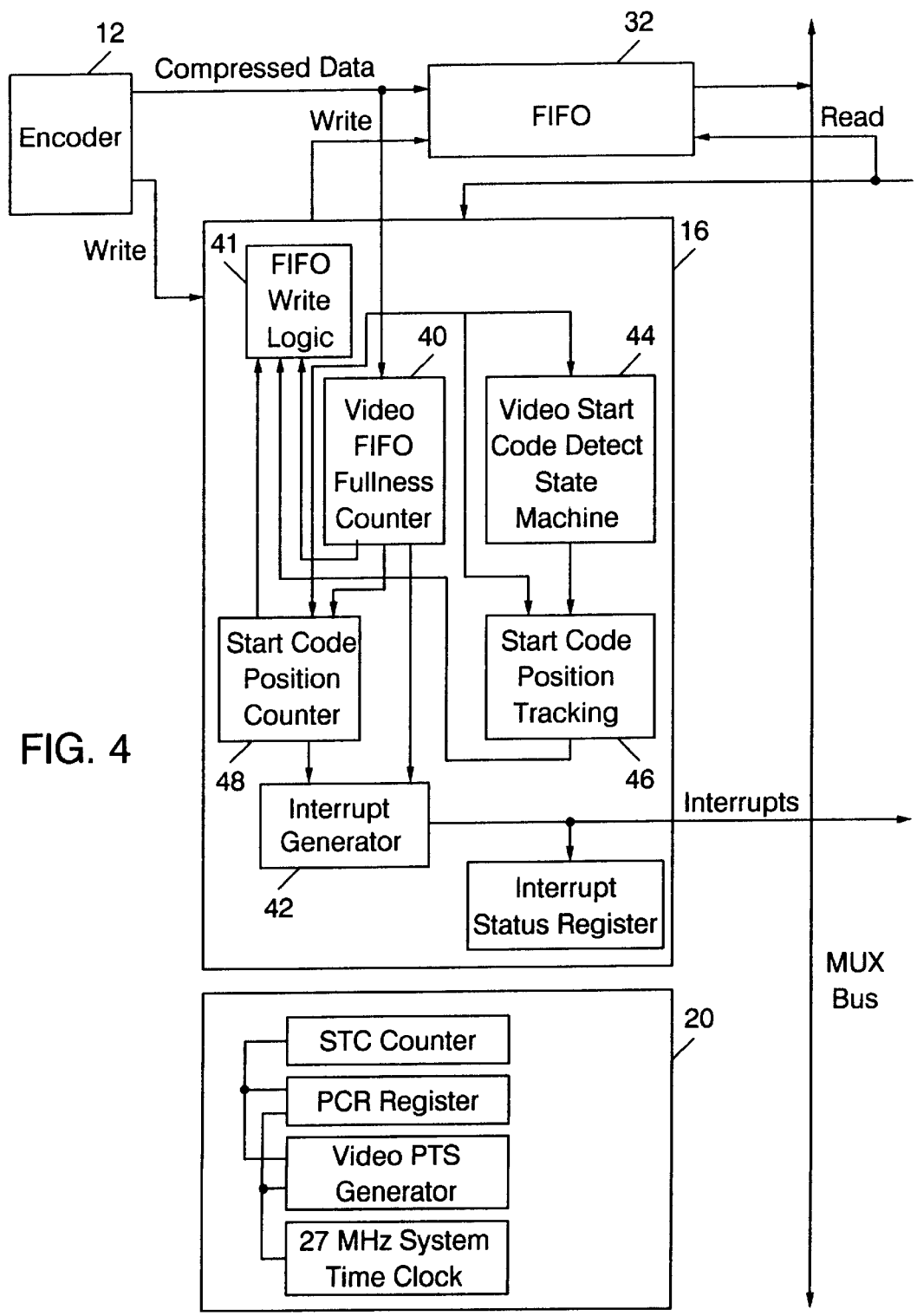
FIG. 4 is schematic diagram showing the functions of both the video and audio mux logic circuits with an encoder and a FIFO.

As further seen in FIG. 4, compressed data from the encoder 12 is dLrected both to a FIFO 32 and to the mux logic circuitry 16. The mux processor 22 (in FIG. 3) is alerted when there is a video start-code in the transport packet payload that it is about to read. This allows the mux processor 22 to create the transport layer at the same time it is creating the underlying PES layer. If the mux 30 is aware that an access unit starts in the next transport packet payload it can create a special transport packet with an adaptation field to contain the PES packet header. The mux 30 will also realize that as a result of the PES header, the transport packet payload will be smaller and it will subsequently read less elementary stream data from the FIFO 32.

Compressed video frame sizes vary significantly and the instantaneous bit-rate is quite bursty especially during scene changes in the source. For this reason, it is possible for the compressed data FIFO 32 to overflow occasionally. Best recovery from these situations involves detecting imminent FIFO overflows just before they happen, blocking all subsequent compressed data from entering the FIFO 32 (data is lost), monitoring frame-sizes out of the video encoder 12, allowing data to begin entering the FIFO 32 only after the frame-sizes have returned to nominal (data is allowed to begin entering the FIFO 32 only on a frame boundary). The architecture chosen for the mux sub-system lends itself to this task well. By putting the start code detect logic at the input to the FIFO 32, frame sizes may be monitored even when data is not being allowed into the FIFO 32. Data entry into the FIFO 32 is controlled by FIFO write logic 41 in the mux logic circuits 16 and 18. Integrating the FIFO write logic 41, start-code detect state machine 44, FIFO-fullness counter 40 within the same logic block allows these three systems to exchange information easily.

The mux processor 22 is informed of elementary stream frame-drop events so that it may insert the appropriate error codes into the elementary stream.

The audio mux logic circuit 18 performs similar functions to the video mux logic circuit 16. It buffers the audio elementary stream data, signals the mux processor 22 when there is sufficient audio data in the FIFO to form the payload of a MPEG-2 transport packet and signals the mux processor 22 when the data in the current payload contains an audio start-of-frame. Audio logic is implemented in exactly the same way as the video logic and is implemented in the same logic block. There is no elementary stream frame-dropping functionality for the audio elementary stream as the audio data is constant bit-rate and FIFO overflow is not a problem.

The clock logic 20 maintains a 27 MHz System Time Clock as per the MPEG-2 standard. It also generates video and audio presentation time stamps (PTS) by latching the System Time Clock (STC) on access unit boundaries. The mux processor 22 is interrupted when a new PTS is available. The PTS is made available to the mux processor 22 and is pre-formatted as per the MPEG-2 standard so that the mux 30 doesn't need to expend effort on bit-shifting operations. The clock logic 20 also generates Program Clock Reference (PCR) time-stamps. The STC is latched to the PCR register once the mux 30 reads from this register. The PCR is pre-formatted as per the MPEG-2 standard so that the mux 30 doesn't need to expend effort on bit-shifting operations.

Treatment of the data by the mux processor 22 involves processing of the video elementary stream. The video processing algorithm in the mux processor 22 packetizes the video elementary streams by adding PES headers and time stamps as specified by the host 27. The packetized elementary stream is then segmented into transport packets and inserted into the payload data unit (PDU) queue. Due to the bursty nature of the video elementary streams, some rate control is also implemented to overcome the problem of excessive data.

Every time the video mux logic 16 buffers enough data to create a transport packet (184 bytes), the mux processor 22 is signaled. The mux processor 22 processes the data in one of two ways: the first method is to treat the data as ordinary payload data, and the other is to treat it as start-of-frame (SOF) data. The method of treatment is determined by whether a start-of-frame (SOF) indicator (not shown) is set by the video mux logic 16.

Ordinary data is simply encapsulated with transport packet headers and queued into the PDU queue. However, start-of-frame data is counted and the count is used to determine whether a presentation time stamp is inserted Rate control is necessary when the channel bandwidth is exceeded by the elementary stream video data and the data is backed up into the video FIFO 32. When the data is backed up into the FIFO 32, a preset FIFO threshold is violated and the video mux logic 16 signals the mux processor 22 to drop data until the data rate has returned to normal.

The basic algorithm for rate control is:

```
if rate control mode is required
(
    if initial packet dropped
    (
        insert the MPEG-2 error sequence indicator
        encapsulate the error sequence inside a transport packet
        queue packet to the NIC
    )
    else
    (
        drop data and keep a track of data rate by counting PDUs in
        a frame if data rate has returned to normal
        (
            remove rate control mode flag
        )
    )
)
```

The audio processing section packetizes the audio elementary streams by adding PES headers and time stamps as specified by the host 27. The packetized elementary stream is then segmented into transport packets and inserted into the PDU queue.

Every time the audio mux logic buffers enough data to create a transport packet (184 bytes), the mux processor 22 is signaled. The mux processor 22 processes the data in one of two ways: the first method is to treat the data as ordinary payload data, and the other is to treat it as a start-of-frame (SOF) data. The method of treatment is determined by whether the start-of-frame indicator is set by the audio mux logic 18.

Ordinary data is simply encapsulated with transport packet headers and queued into the PDU queue. However, start-of-frame data is counted and the count is used to determine whether a presentation time stamp is inserted.

The PCR program clock reference packet is generated at intervals specified by the host software. Due to the sensitive nature of the time reference to jitter, the actual reference value is only captured just prior to being read by the NIC 15 to avoid any buffering delay. This block serves to set a flag to indicate that such PDU is to be generated by the NIC interface section.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

We claim:

1. A multimedia terminal having a host processor, an encoder, a system clock (STC), the output of said encoder being input as compressed digital video frames into a multiplexer, said multiplexer comprising:

(a) a mux processor for packetizing the compressed video frames;

(b) a FIFO buffer coupled to the encoder operative to buffer digital video data and responsive to the MUX processor to output data from the buffer to the MUX processor;

(c) a video mux logic circuit coupled to said mux processor and said video FIFO buffer, operative to provide status signals to the MUX processor concerning FIFO buffer status, to monitor video FIFO buffer fullness and to signal the mux processor when there is sufficient video data in said video FIFO buffer to form the payload of a transport packet in accordance with an encoder/decoder protocol.

2. A terminal according to claim 1 wherein the encoder/decoder protocol is an MPEG-2 protocol and said MUX processor packetizes said units by adding PES headers and time stamps as specified by the host processor.

3. A terminal according to claim 1, wherein said video mux logic circuit includes means for signaling the mux processor when the video elementary stream has an excessively high rate of data and rate control by the MUX processor is required.

4. A terminal according to claim 1, wherein said video mux logic circuit includes means for signaling said mux processor to drop an elementary video stream frame in response to the channel bandwith being exceeded by the elementary stream video data resulting in the data into the video FIFO buffer being backed up.

5. A method of controlling video FIFO buffer overflows caused by a high rate of compressed digital video signals being sent by a video encoder, comprising:

(a) detecting imminent video FIFO buffer overflows by monitoring the output of the video encoder prior to entry into the video FIFO buffer;

(b) blocking all subsequent compressed data from entering the video FIFO buffer;

(c) monitoring frame sizes out of said video encoder while the compressed data is blocked from entering the video FIFO buffer; and (d) allowing data to begin entering said video FIFO buffer again when frame-sizes from said encoder have returned to a nominal size.

6. A method according to claim 5, wherein said detecting step comprises detecting start codes at an input to said video FIFO so that frame sizes may be monitored even when data is not being allowed into said video FIFO.

7. A multimedia terminal having a host processor, an encoder, a system clock (STC), the output of said encoder being input as compressed digital video frames into a multiplexer, said multiplexer comprising:
  (a) a mux processor;
  (b) a FIFO buffer operative to buffer digital video data; and
  (c) a video mux logic circuit coupled to said mux processor and said video FIFO, operative to monitor video FIFO fullness and to signal the mux processor when there is sufficient video data in said video FIFO to form the payload of a transport packet in accordance with an encoder/decoder protocol wherein said video mux logic circuit signals said mux processor when a video start-code is in the transport packet payload that it is about to read.

8. A multimedia terminal having a host processor, an encoder, a system clock (STC), the output of said encoder being input as compressed digital video frames into a multiplexer, said multiplexer comprising:
  (a) a mux processor;
  (b) a FIFO buffer operative to buffer digital video data; and
  (c) a video mux logic circuit cupled to said mux processor and said video FIFO, operative to minitor vidor FIFO fullness and to signal the mux processor when there is sufficient video data in said video FIFO to form the payload of a transport packet in accordance with an encoder/decoder protocol wherein said video mux logic includes a video state machine coupled to said video FIFO operative to track video start-codes through said video FIFO.

9. A multimedia terminal having a host processor, an encoder, a system clock (STC), the output of said encoder being input as compressed digital video frames into a multiplexer, said multiplexer comprising:
  (a) a mux processor;
  (b) a FIFO buffer operative to buffer digital video data; and
  (c) a video mux logic circuit coupled to said mux processor and said video FIFO, operative to monitor video FIFO fullness and to signal the mux processor when there is sufficient video data in said video FIFO to form the payload of a transport packet in accordance with an encoder/decoder protocol; and
  (d) video FIFO write logic coupled to said video FIFO and operative to control writing of compressed data to said video FIFO.

10. A terminal according to claim 9, including a video start code detect state machine coupled to said compressed data, a video start code position tracking circuit operative to track the position of a video start code marking the beginning of an elementary video stream, a vidor FIFO buffer fullness counter having an input coupled to an output of said encoder and an output coupled to said video FIFO buffer write logic circuit, operative to measure the amount of video data in said video FIFO buffer, a video start code position coupled to an output of said video FIFO buffer fullness counter operative to record the advance of said video start code through said video FIFO buffer, whereby said multiplexer is provided with advance knowledge of whether a ones frame begins with a next available packet of elementary video stream data.

11. A method of controlling video FIFO overflows caused by a high rate of compressed digital video signals being sent by a video encoder, comprising:
  (a) detecting imminent video FIFO overflows;
  (b) blocking all subsequent compressed data from entering the video FIFO;
  (c) monitoring frame sizes out of said video encoder;
  (d) allowing data to begin entering said video FIFO when frame-sizes from said encoder have returned to a nominal size; and
  (e) informing said mux processor of elementary video stream frame drop events so that it may insert corresponding error codes into the elementary video stream.

* * * * *